(12) United States Patent
Rytlewski et al.

(10) Patent No.: US 10,329,876 B2
(45) Date of Patent: Jun. 25, 2019

(54) VALVE WITH INTEGRAL PISTON

(71) Applicant: Schlumberger Technology Corporation, Sugar Land, TX (US)

(72) Inventors: Gary L. Rytlewski, League City, TX (US); David Carter Allensworth, Pearland, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 558 days.

(21) Appl. No.: 14/778,298

(22) PCT Filed: Mar. 21, 2014

(86) PCT No.: PCT/US2014/031392
§ 371 (c)(1),
(2) Date: Sep. 18, 2015

(87) PCT Pub. No.: WO2014/153488
PCT Pub. Date: Sep. 25, 2014

(65) Prior Publication Data
US 2016/0281462 A1    Sep. 29, 2016

Related U.S. Application Data

(60) Provisional application No. 61/804,506, filed on Mar. 22, 2013.

(51) Int. Cl.
*E21B 29/08* (2006.01)
*E21B 34/10* (2006.01)
(Continued)

(52) U.S. Cl.
CPC ............. *E21B 34/10* (2013.01); *E21B 29/04* (2013.01); *E21B 29/08* (2013.01); *E21B 33/063* (2013.01);
(Continued)

(58) Field of Classification Search
CPC .................. E21B 34/10; E21B 34/045; E21B 29/00–29/12; E21B 33/063;
(Continued)

(56) References Cited

U.S. PATENT DOCUMENTS 2,549,337 A * 4/1951 Werner ................. F16K 5/0621
251/59
5,167,283 A * 12/1992 Smith .................... E21B 21/001
166/373

(Continued)

FOREIGN PATENT DOCUMENTS

| EP | 2409061 B1 | 12/2012 |
| WO | 198809457 A1 | 12/1988 |
| WO | 2014011639 A1 | 1/2014 |

OTHER PUBLICATIONS

Search Report and Written Opinion of International Applicatipn No. PCT/US2014/031392 dated Aug. 8, 2014, 9 pages.

(Continued)

*Primary Examiner* — George S Gray
(74) *Attorney, Agent, or Firm* — Brandon S. Clark

(57) ABSTRACT

A technique facilitates valve operations in many applications including well related applications. A valve utilizes a piston which moves along an arc. The valve has an outer housing and an inner housing spaced to create an arcuate pressure chamber which extends along the arc. A piston is mounted in the arcuate pressure chamber for movement along the arc. A hydraulic force or other force may be selectively applied directly against an end of the arcuate piston to shift the arcuate piston along the arc. In some applications, the piston comprises a cutting edge oriented to enable performance of a cutting operation.

20 Claims, 5 Drawing Sheets

(51) Int. Cl.
*F16K 5/06* (2006.01)
*E21B 29/04* (2006.01)
*E21B 33/06* (2006.01)
*F16K 31/122* (2006.01)
*F16K 3/22* (2006.01)
*E21B 34/00* (2006.01)

(52) U.S. Cl.
CPC .............. *F16K 3/22* (2013.01); *F16K 5/0621* (2013.01); *F16K 31/122* (2013.01); *E21B 2034/002* (2013.01); *E21B 2034/007* (2013.01)

(58) Field of Classification Search
CPC ......... E21B 2034/007; E21B 2034/002; F16K 31/122; F16K 3/22–3/243; F16K 3/26; F16K 3/265; F16K 5/0621
See application file for complete search history.

(56) References Cited

U.S. PATENT DOCUMENTS

| | | |
|---|---|---|
| 5,560,324 A | 10/1996 | Howard |
| 6,170,524 B1 | 1/2001 | Gray, Jr. |
| 7,617,876 B2 | 11/2009 | Patel et al. |
| 9,410,391 B2 | 8/2016 | Guven et al. |
| 2010/0051847 A1 | 3/2010 | Mainland |

OTHER PUBLICATIONS

Preliminary Report on Patentability of International Application No. PCT/US2014/031392 dated Oct. 1, 2015, 6 pages.
Exam Report of EP Application No. 14767831.2, dated Nov. 21, 2016, 5 pages.
Search Report of EP Application No. 14767831.2, dated Nov. 8, 2016, 3 pages.

* cited by examiner

VALVE WITH INTEGRAL PISTON

BACKGROUND

Hydrocarbon fluids such as oil and natural gas are obtained from a subterranean geologic formation, referred to as a reservoir. The hydrocarbon fluids may be obtained by drilling a well that penetrates the hydrocarbon-bearing formation. Once a wellbore is drilled, various forms of well completion components may be installed to provide control and to enhance the efficiency of producing the various fluids from the reservoir. One type of well completion component is a ball valve.

Various ball valves may be used in, for example, subsea landing string systems to provide cutting capability. The cutting capability is provided by a large hydraulic force applied to a piston which moves downwardly. In these types of systems, the large force is transmitted to rotate a ball of the ball valve via two pins located between the ball valve and the piston. However, the interface surfaces between the pins and the piston or between the pins and the ball valve tend to deform when high forces are transmitted from the piston to the ball during a cutting operation.

SUMMARY

In general, a system and methodology are provided for a valve and use of the valve in many applications including well related applications. The valve utilizes a piston which moves along an arc forming, for example, part of a circle. In such applications, the valve may be referred to as a ball valve. The valve has an outer housing and an inner housing spaced to create an arcuate pressure chamber which extends along the arc. A piston is mounted in the arcuate pressure chamber for movement along the arc. A force, e.g. a hydraulic force, may be selectively applied directly against an end of the arcuate piston to shift the arcuate piston along the arc. In some applications, the piston may comprise a cutting edge oriented to enable performance of a cutting operation under the influence of the force applied directly to the piston end.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
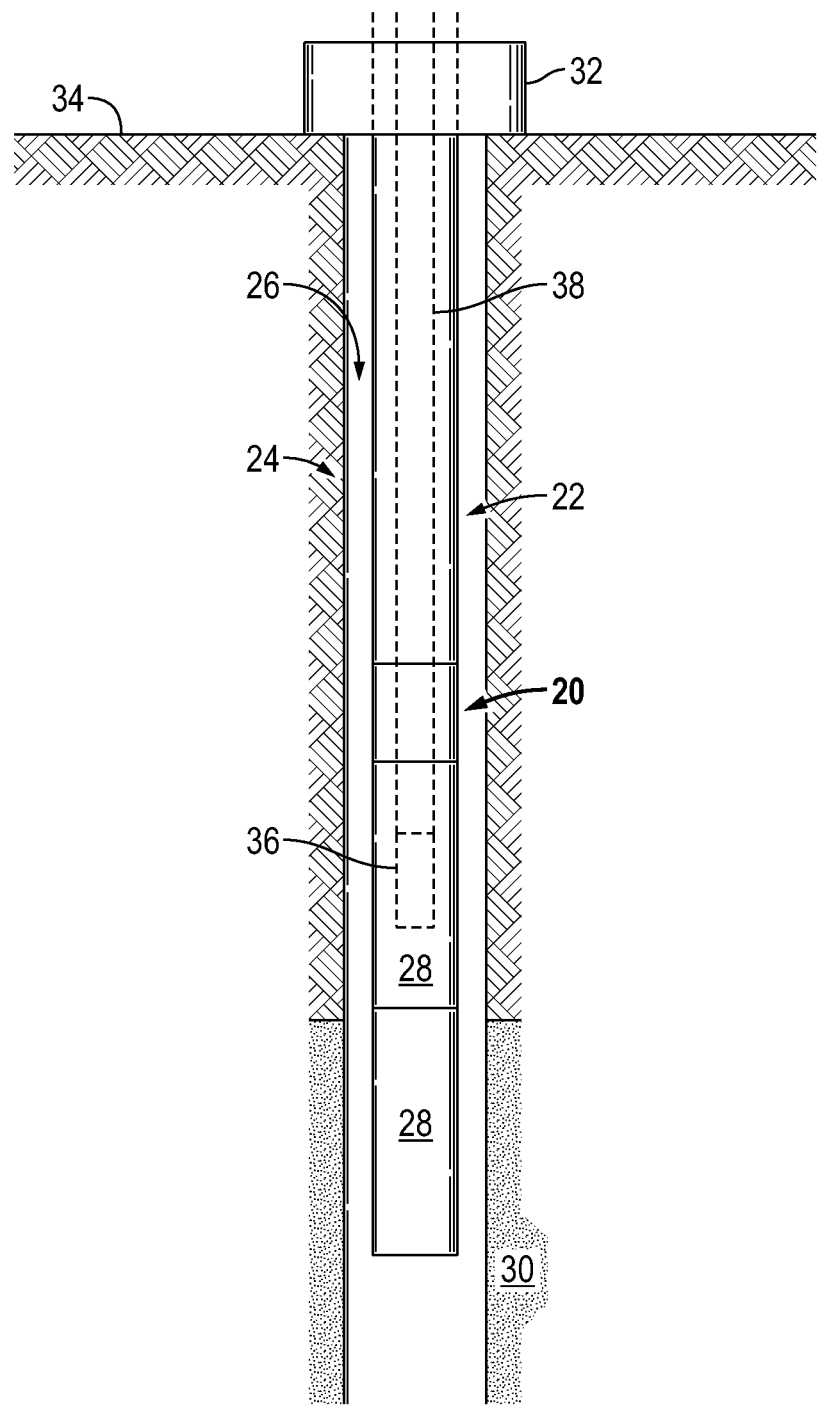
FIG. 1 is a schematic illustration of an example of a well completion deployed in a wellbore and comprising a valve, such as a ball valve, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for utilizing a valve in well related applications, e.g. subsea well applications, and other applications. In well applications, the valve may be incorporated into a completion deployed downhole in a wellbore. In other well applications, however, the valve may be used in a wellhead or in other subsea or surface equipment.

By way of example, the valve may comprise a ball valve having an arcuate piston which moves along an arc defining part of a circle. For example, the arcuate piston may be formed as a portion of a sphere which moves along the arc about a center point of the circle toward a closed or open position. In such embodiments, the portion of the sphere is formed like a ball or like a partial ball which can be pivoted about the center point, thus establishing the valve as a ball valve. In certain embodiments, the ball valve has an outer housing and an inner housing spaced to create an arcuate pressure chamber which extends along the arc. The arcuate piston is mounted in the arcuate pressure chamber for movement along the arc. A force, e.g. a hydraulic force, may be selectively applied directly against an end of the arcuate piston to shift the arcuate piston over a desired range along the arc.

The arcuate piston may have a variety of forms, but generally comprises a radially inward arcuate surface and a radially outward arcuate surface. The end or ends of the arcuate piston against which the force acts may comprise the edge surface or edge surfaces extending between the radially inward and outward arcuate surfaces. In some applications, the piston may comprise a cutting edge oriented to enable performance of a cutting operation under the influence of the force applied directly to the piston end. By way of example, the cutting edge may be oriented to cut through a conveyance, e.g. coil tubing, or other tool extending through a passage disposed through the valve. The arcuate piston also may be combined with a seal or seals to provide a shearing and sealing apparatus. The force to actuate the valve and to move the arcuate piston across the passage may be provided via hydraulic pressure or another suitable technique.

Embodiments described herein greatly simplify the actuating mechanism for rotating a section of a ball valve. In various embodiments, the simplification is achieved at least in part by making the ends or edges of the ball valve element the same ends or edges of the arcuate piston that operates the valve. The configuration allows hydraulic force to be applied directly to the ball element of the valve, i.e. directly to the arcuate piston which moves along the arc, e.g. the circular arc, between valve open and valve closed positions. The valve construction has very few moving parts because the mechanical linkage components have been removed, thus enabling application of large closing/cutting forces.

Referring generally to FIG. 1, an example of a valve 20 is illustrated as part of a completion 22 deployed in a well 24. The completion 22 is deployed downhole into a wellbore 26 and may comprise a variety of completion components 28 depending on the parameters of the well application. Well 24 may comprise a subsea well or a surface well in which the wellbore 26 extends down into a subterranean formation 30 from surface equipment 32, e.g. a wellhead, located at a surface 34, e.g. a seabed or surface of the earth.

Depending on the application, various tools may be conveyed down through the completion 22. For example, a variety of service tools 36 may be conveyed down through completion 22 and through valve 20 via a conveyance 38, such as coil tubing or wireline. As described in greater detail below, the valve 20 may be designed to enable selective severing of the conveyance 38 or other tools extending through the valve 20. This enables a rapid well closure by severing the conveyance and closing off the passage extending longitudinally through completion 22. It should be noted, however, that valve 20 may be used in a variety of other applications, including a variety of well and non-well applications.

Figure 2:
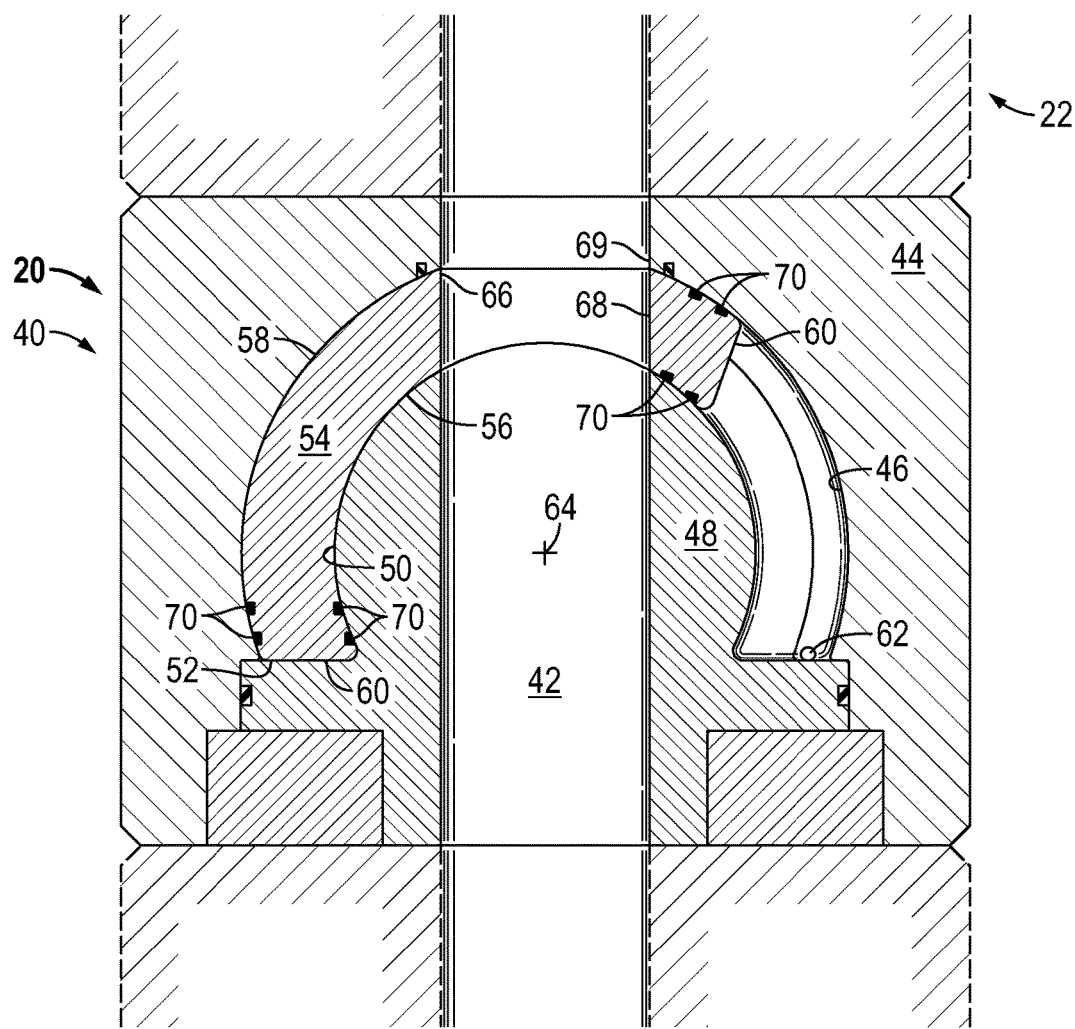
FIG. 2 is a cutaway view of an example of the valve illustrated in FIG. 1, according to an embodiment of the disclosure.

Referring generally to FIG. 2, an example of valve 20 is illustrated. In this embodiment, valve 20 comprises a ball valve 40 positioned along completion 22 to interact with a passage 42 extending longitudinally through completion 22 and ball valve 40. Passage 42 may be used to accommodate fluid flow and service tools, such as service tool 36, conveyed downhole through valve 20 via conveyance 38.

In the example illustrated, the ball valve 40 comprises an outer ball valve housing 44 having an arcuate inner surface 46 which may be shaped as a portion of a sphere surface. The ball valve also comprises an inner ball valve housing 48 having an arcuate outer surface 50 which also may be shaped as a portion of a sphere surface. The arcuate outer surface 50 is spaced from the arcuate inner surface 46 to create a pressure chamber 52. A piston 54 is slidably mounted in the pressure chamber 52 for sliding movement between operational positions. Piston 54 serves as the ball element in ball valve 40.

The piston 54 may have an arcuate shape, such as an arcuate shape in the form of a portion of a sphere or ball. The arcuate shape is defined by a radially inner surface 56 and a radially outer surface 58 and a pair of ends 60 which are end surfaces or faces disposed at the circumferential edges of the arcuate piston 54. The form of piston 54 may extend along an arc of a circular path extending between ends 60. Similarly, the form of pressure chamber 52 may be arcuate and may extend along an arc of a common circular path with piston 54.

Figure 3:
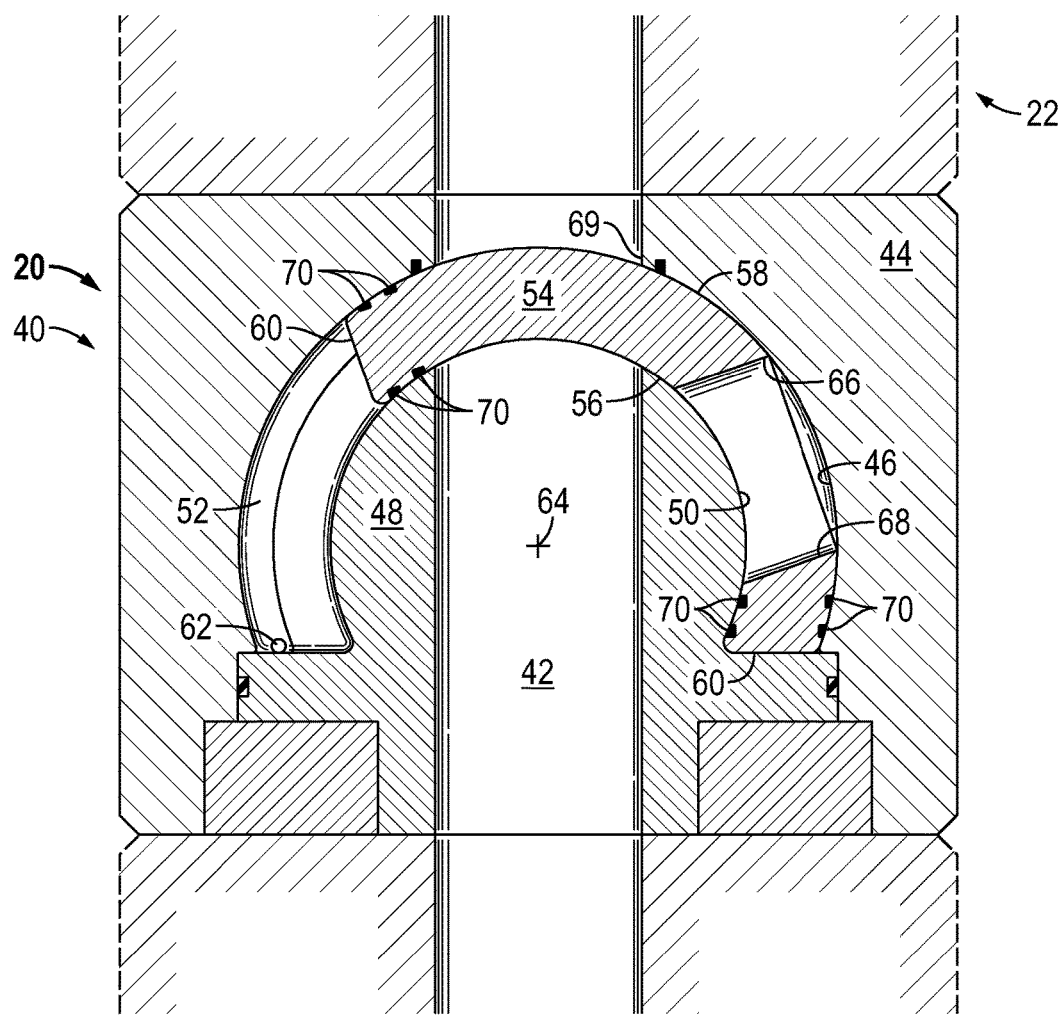
FIG. 3 is a view similar to that of FIG. 2 but showing the valve in a different operational position, according to an embodiment of the disclosure.

The ends or edges 60 provide the surfaces against which force may be applied to shift the arcuate piston 54 between an operationally open position, as illustrated in FIG. 2, and an operationally closed position, as illustrated in FIG. 3. The force to shift arcuate piston 54 between its operational positions may be supplied by hydraulic pressure via hydraulic fluid introduced into pressure chamber 52 at appropriately located hydraulic ports 62, as illustrated in both FIG. 2 and FIG. 3. As hydraulic pressure is sufficiently applied, the arcuate piston 54 is shifted and translates along the arc of its circular path between operational positions and thus pivots about a center point 64 of the circular path.

Figure 4:
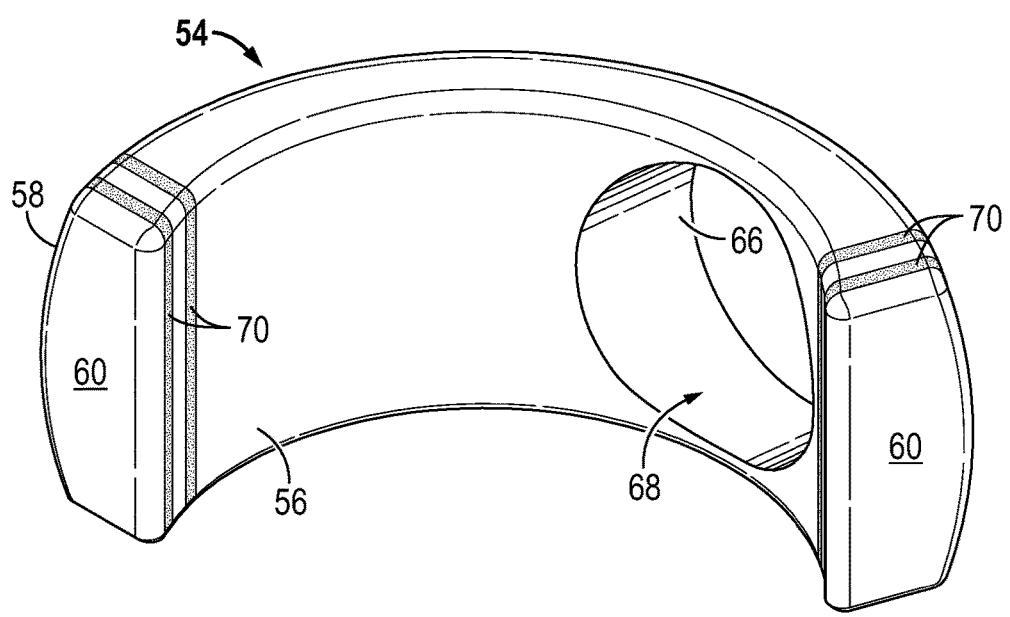
FIG. 4 is an orthogonal view of an example of a substantially monolithic arcuate piston employed in the valve embodiment illustrated in FIGS. 2 and 3, according to an embodiment of the disclosure.

In various embodiments, the substantially monolithic, or, "single-piece", arcuate piston 54 also may comprise a cutting edge 66, as further illustrated in FIG. 4. As used herein, the term "single-piece" is not meant to infer that multiple components or pieces may not be joined together or welded immobly together to form the "single-piece" but rather to suggest that the single-piece piston behaves as would be expected of a single piece component as described herein. Along these lines, the piston may also be defined as having an arcuate top edge and an arcuate bottom edge, such edges being generally parallel to one another along a length of the piston. Depending on the application, the cutting edge 66 may be located along either radially inner surface 56 or radially outer surface 58 of arcuate piston 54. As illustrated in the embodiment of FIGS. 2-4, the cutting edge 66 may be arcuate. Additionally, the cutting edge 66 may be disposed along an aperture 68, e.g. a circular aperture, extending radially through piston 54 and through radially inner and outer surfaces 56 and 58. When sufficient pressure is built up in pressure chamber 52, a force is created against the appropriate end 60 to force cutting edge 66 through conveyance 38 (or other tool) extending through the valve 20 along passage 42. In other words, the piston 54 and cutting edge 66 cooperate to function as a gate which moves through passage 42 in a substantially linkage-free manner. In well applications, the conveyance/coil tubing 38 or other tool may be sheared between cutting edge 66 and a corresponding shear edge or surface 69. In the embodiment illustrated, aperture 68 may be sized to receive the tool 36 and conveyance 38 therethrough when ball valve 40 is in the operationally open position, as illustrated in FIG. 2.

In some applications, valve 20 also may comprise a seal system having at least one seal 70 positioned to form a seal between piston 54 and at least one of the outer ball valve housing 44 or inner ball valve housing 38. By way of example, the at least one seal 70 may comprise a plurality of seals disposed on opposite sides of aperture 68 to enable a sealing off of passage 42 after performing a cutting operation by shifting arcuate piston 54 to the operationally closed position illustrated in FIG. 3. This type of embodiment provides valve 20, e.g. ball valve 40, with a shearing and sealing capability.

The seal or seals 70 may be located between the piston 54 and the arcuate inner surface 46. In some applications, a plurality of seals 70, e.g. a pair of seals, may be located between the piston 54 and the arcuate inner surface 46. For example, a seal or a group of seals 70 may be located on opposing longitudinal sides of aperture 68 between piston 54 and surface 46. The seal or seals 70 also may be located between piston 54 and arcuate outer surface 50. A seal or a group of seals 70 may be located on opposing longitudinal sides of aperture 68 between piston 54 and surface 50. As illustrated, seals 70 also may be located between piston 54 and both arcuate inner surface 46 and arcuate outer surface 50 on one longitudinal side or both longitudinal sides of aperture 68. The radially inner and/or outer cutting edge 66 as well as the radially inner and/or outer placement of seals 70 is illustrated in the embodiments of FIGS. 2 and 3.

Additionally, some applications utilize an arrangement having cutting edge 66 and seal or seals 70 on opposite radial surfaces of piston 54. For example, the seal or seals 70 may be disposed along radially outer surface 58 of piston 54 while the cutting edge 66 is located along the radially inner surface 56 of piston 54. Conversely, the seal or seals 70 may be disposed along radially inner surface 56 of piston 54 while the cutting edge is located along the radially outer surface 58 of piston 54. Depending on the application, cutting and sealing may be improved when cutting is performed along the outside diameter of piston 54 and seals 70 are located along an inside diameter of piston 54. Separating the cutting surface from the sealing surface often is helpful because the cutting surface is susceptible to damage which creates difficulty in maintaining a seal along the cutting surface. In some embodiments, seals 70 can be used along the cutting surface as backup seals. Cutting edge 66 also may comprise a plurality of cutting edges 66, such as cutting edges 66 disposed along aperture 68 at both radially inner piston surface 56 and radially outer piston surface 58.

The piston 54 and the structure of overall ball valve 40 may be formed to enable actuation of piston 54 in a single direction, e.g. a closing and cutting direction. In the illustrated example, however, hydraulic ports 62 are provided on both ends of pressure chamber 52 to enable actuation of piston 54 in both a closing and an opening direction. This enables opening of the valve 40 (see FIG. 2) after cutting edge 66 is moved across passage 42 to cut the conveyance 38 or other tool during shifting of piston 54 to the closed position illustrated in FIG. 3.

The shape of piston 54 may be formed as part of a sphere, e.g. as a portion of a sphere wall. For example, a cross-section of the piston 54 may have a "D" shape or an otherwise round shape selected to improve sealing durability, to increase surface area, and/or to otherwise promote actuation. The integral piston 54 may be used for operating a sealing valve, a cutter valve, or a valve that is able to cut and seal. The structure of piston 54 and overall ball valve 40 provides a high tolerance to bore debris. Because there is just the moving piston 44, and the piston moves into clean control chambers, e.g. opposing portions of pressure chamber 52, the overall ball valve 40 is very tolerant with respect to debris.

Figure 5:
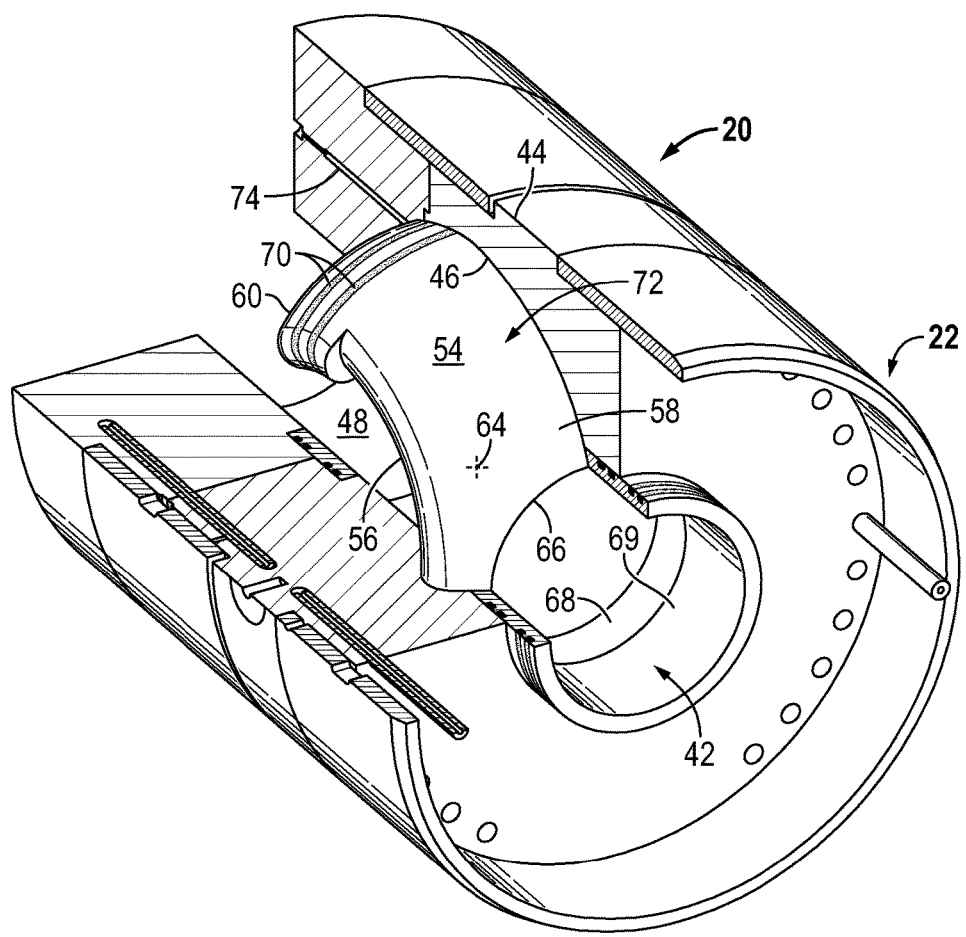
FIG. 5 is a cutaway view of another embodiment of the valve illustrated in FIG. 1, according to an embodiment of the disclosure.

Referring generally to FIG. 5, another embodiment of valve 20 is illustrated. Similar to the embodiment illustrated in FIGS. 2-4, the example illustrated in FIG. 5 utilizes arcuate piston 54 disposed between outer housing 44 and inner housing 48. In this example, valve 20 is operated by applying pressure against the appropriate piston end 60 to either open or close the valve by rotating the arcuate piston 54 about center point 64. In some applications, the valve 20 may be constructed with a bore bias which biases piston 54 to an open position, but the bias can be reversed or removed depending on the parameters of a given application. The bias may be applied by a spring member or other device capable of providing a suitable bias. Depending on the application, the piston may be formed as a single peace or a plurality of pieces, e.g. a combined piston member and gate member.

The embodiment illustrated in FIG. 5 may utilize a curved, kidney-shaped piston 54 comprising a separate gate member 72 having cutting edge 66. In well applications, the cutting edge 66 is again oriented to move through passage 42 to facilitate cutting of wireline, coil tubing, a variety of other conveyances, and/or tools. The construction provides a valve with a short length which can be operated with lower hydraulic pressures and lower hydraulic volumes. By way of example, the arcuate piston 54 may be actuated hydraulically via hydraulic fluid delivered to the appropriate port 62 through fluid flow passages 74.

As illustrated, the outer housing 44 may be formed with one or more cylindrical parts which provide a relatively simple construction. In some embodiments, the outer housing 44 and inner housing 48 may be secured together or formed of a single piece of material. The piston cavity which is illustrated as pressure chamber 52 may be constructed by rotating an electric discharge machining (EDM) electrode through the housing material and then polishing the cavity by, for example, abrasive flow machining However, other techniques and constructions may be used to form pressure chamber 52. Depending on the size, shape, and/or materials of the pressure chamber 52 and the corresponding housing sections, the seals 70 may have a variety of structures, orientations, and numbers to achieve the desired sealing in applications where valve 20 is used to both shear a conveyance (or other tool) and to seal off passage 42.

The valve 20 may be formed as ball valve 40 with an arcuate piston 54 that rotates about a center point 64. However, the structure of outer housing 44 and inner housing 48 may be formed to accommodate a variety of other types of arcuate pistons 54 which move along corresponding pressure chambers via forces acting against the end or ends of the pistons. In many applications, the forces are provided by pressurized hydraulic fluid although other techniques, e.g. pneumatic, mechanical, or electro-mechanical techniques, may be employed.

Similarly, the form of the cutting edge 66 (or cutting edges 66) may vary from one application to another. For example, the cutting edge 66 may be constructed along a variety of curves or as a generally straight cutting edge. Additionally, the cutting edge 66 may be used in cooperation with various corresponding edges or surfaces 69 to facilitate the shearing of many types of materials and tools. The sealing capabilities also may vary depending on the parameters of a given application. In some applications, sealing may not be desired while other applications utilize sealing along the piston exterior, piston interior, or both the interior and exterior of piston 54. The size, construction, and arrangement of components can vary depending on environmental parameters and other parameters of a given application.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a well, comprising:
    a well completion having a valve positioned to interact with a passage through the well completion, the valve comprising:
    an outer housing having an arcuate inner surface;
    an inner housing having an arcuate outer surface spaced from the arcuate inner surface to create a pressure chamber; and
    a single-piece piston slidably mounted in the pressure chamber, the piston having an arcuate shape extending between a piston end and a cutting edge such that sufficient buildup of hydraulic fluid pressure in the pressure chamber acts directly against the piston end to shift the piston and move the cutting edge across the passage in a linkage-free manner.

2. The system as recited in claim 1, further comprising a seal between the piston and the arcuate inner surface.

3. The system as recited in claim 1, further comprising a pair of seals between the piston and the arcuate inner surface.

4. The system as recited in claim 1, further comprising a seal between the piston and the arcuate outer surface.

5. The system as recited in claim 1, further comprising a pair of seals between the piston and the arcuate outer surface.

6. The system as recited in claim 1, wherein the cutting edge is disposed along an aperture extending through the piston.

7. The system as recited in claim 1, further comprising a seal disposed along a radially outer surface of the piston, wherein the cutting edge is located along a radially inner surface of the piston.

8. The system as recited in claim 1, further comprising a seal disposed along a radially inner surface of the piston, wherein the cutting edge is located along a radially outer surface of the piston.

9. The system as recited in claim 1, wherein the piston further comprises an opposed piston end so that hydraulic pressure may be applied selectively against the piston end or the opposed piston end to close off and to open the passage, respectively.

10. The system as recited in claim 1, wherein the arcuate shape of the piston is in the form of a portion of a sphere.

11. A system, comprising:
a valve having:
an outer housing with an arcuate inner surface and an inner housing with an arcuate outer surface, the surfaces defining a pressure chamber there between; and
a single-piece piston slidably mounted between the arcuate inner surface and the arcuate outer surface for movement along an arc of a circular path in response to hydraulic fluid pressure directly against a piston end of the piston, the valve having a passage therethrough and the piston having a cutting edge opposite the piston end and oriented such that movement of the piston along the arc in a closing direction causes the cutting edge to move across the passage in a linkage-free manner.

12. The system as recited in claim 11, further comprising a seal mounted on the piston.

13. The system as recited in claim 12, wherein the seal and the cutting edge are located along opposite surfaces of the piston with respect to each other.

14. The system as recited in claim 11, further comprising a pair of seals mounted on the piston.

15. The system as recited in claim 11, wherein the cutting edge is located along a circular aperture extending through the piston.

16. The system as recited in claim 11, wherein the piston is hydraulically actuated via hydraulic pressure applied against a piston end.

17. A method for use in a wellbore, comprising:
providing a valve with an outer housing and an inner housing spaced to create an arcuate pressure chamber extending along an arc formed as a portion of a circle;
movably mounting a single-piece arcuate piston in the arcuate chamber for movement along the arc; and
selectively applying a force through hydraulic fluid directly against an end of the arcuate piston to shift the arcuate piston along the arc in a linkage-free manner.

18. The method as recited in claim 17, wherein selectively applying the force comprises selectively applying hydraulic pressure.

19. The method as recited in claim 17, further comprising providing the arcuate piston with a cutting edge oriented to perform a cutting operation when the arcuate piston is shifted along the arc.

20. The method as recited in claim 17, further comprising positioning the valve in a well completion; and conveying the well completion downhole into a wellbore.

* * * * *